J. SEADLER.
CUSHION TIRE FOR VEHICLES.
APPLICATION FILED MAR. 28, 1913.
1,081,518.
Patented Dec. 16, 1913.
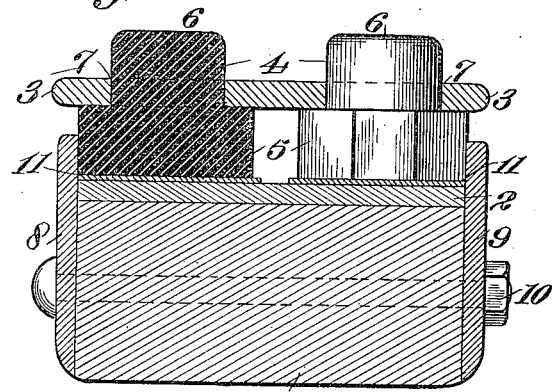
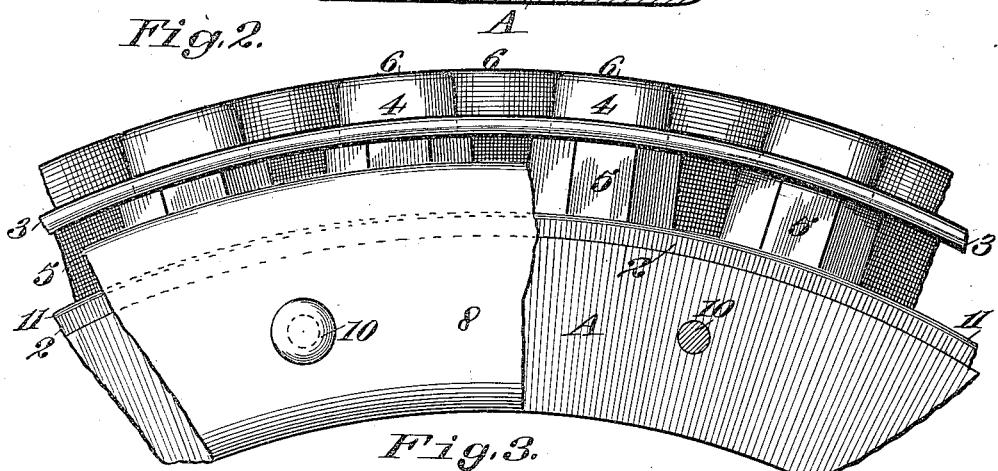
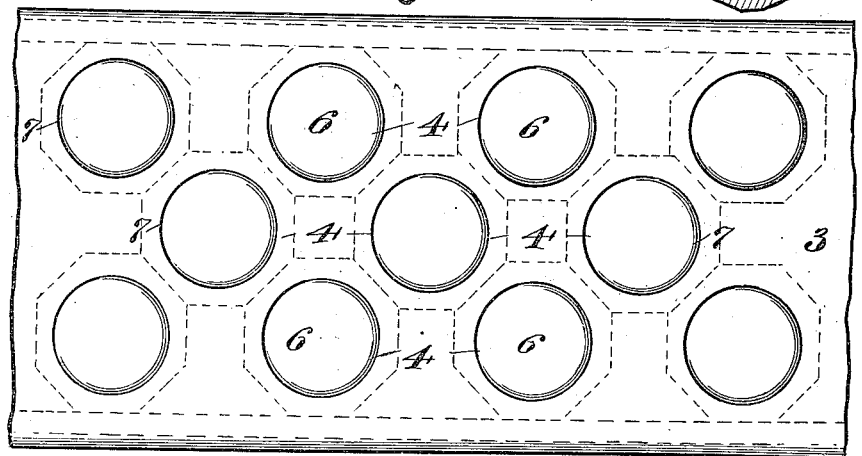
WITNESSES:
Charles Pickler
Thos Eastberg
INVENTOR
James Seadler.
By G. H. Strong.
ATTORNEY

UNITED STATES PATENT OFFICE.

JAMES SEADLER, OF SACRAMENTO, CALIFORNIA.

CUSHION-TIRE FOR VEHICLES.

1,081,518.

Specification of Letters Patent. Patented Dec. 16, 1913.

Application filed March 28, 1913. Serial No. 757,293.

*To all whom it may concern:*

Be it known that I, JAMES SEADLER, a citizen of the United States, residing at Sacramento, in the county of Sacramento and State of California, have invented new and useful Improvements in Cushion-Tires for Vehicles, of which the following is a specification.

This invention relates to cushion tires for vehicles.

The main object of this invention is to provide a cushion tire which shall be particularly adapted for use on heavy freighting trucks of the motor-driven type.

Another object of the invention is to construct a tire which consists of independent removable sections, adapted to be applied to the outer periphery of an ordinary wheel; tires formed of independent resilient sections or blocks, together with a suitable interlocking means, producing a tire of the non-skidding type, which has considerable resiliency with unusual strength and durability.

The invention consists of the parts and the construction and combination of parts as hereinafter more fully described and claimed having reference to the accompanying drawings, in which—

Figure 1 is a cross section of the tire. Fig. 2 is a side elevation, partly broken away. Fig. 3 is a plan view, showing the interlocking ring and the position of the independent tread sections.

Referring to the drawings: A indicates a portion of a wheel of the usual construction, around the outer periphery of which is secured the usual tire band 2, and surrounding same in concentric spaced relation is an interlocking ring 3, between which and the inner band 2 are placed a suitable number of independent elastic tread sections, generally indicated at 4. The independent elastic tire sections here shown are provided with base portions 5, adapted to set firmly between the inner and outer rings 2 and 3, and also provided with projecting tread portions 6, which project through perforations 7, formed in the interlocking ring for this purpose. For the purpose of locking the tread sections against side movement, any suitable side plates may be applied, as indicated at 8 and 9, which are secured in position by bolts 10.

In operation, when it is desired to place the resilient tire section in position on the felly encircling band 2, it becomes necessary to place the tread projections 6 in position in the opening 7, formed in the interlocking ring, the side plate 9 being removed, it will then be possible to slide the interlocking ring, together with the independent resilient sections, into position on the felly encircling band, and in some instances, where it is desired to produce a considerable compression of the elastic base portion 5 between the outer and inner rings 2 and 3, it becomes necessary to force shims, as 11, between the base portions 5 of the independent elastic sections and the tire band 2. These shims may consist of a continuous annular ring, or may be formed in as many independent sections as may prove desirable. The side plates 8 and 9 are then secured in position by the bolts 10, making the tire ready for use. The interlocking ring 3 will thus form part of the running tread of the wheel, while the resilient projections 6, projecting through the surface of the ring, will form an ideal anti-skid surface. It may also be seen that any section injured or too much worn may be easily replaced at any time by simply removing one or another of the side plates 8 or 9, and that any degree of resiliency between the outer and inner rings may be secured by varying the elasticity of the composition, or by increasing or decreasing the thickness of the shims 11.

The tire constructed as here shown is simple and compact in construction and is particularly adapted for heavy freighting purposes in connection with motor-driven trucks and the like. The materials and finish of the several parts may be such as judgment and experience of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is:

1. In a vehicle tire, the combination with the metallic tire and felly of a wheel, of an interlocking tread ring spaced in concentric relation with same, perforations formed in the interlocking tread ring, resilient hexagonal shaped block members interposed between the rings, tread portions formed on the block members projecting through the perforations in the interlocking ring, shims interposed between the resilient block members and the tire to vary the resiliency of the block members, and means for securing the resilient block members against side movement on the tire.

2. In a vehicle tire, the combination with the metallic tire and felly of a wheel, of an interlocking tread ring spaced in concentric relation with same, perforations formed in the interlocking tread ring, independent resilient members interposed between the rings having knob-shaped extensions formed on their outer surface, projecting through the perforations in the outer ring to form an antiskid tread surface, shims interposed between said resilient members and the metallic tire to vary the resiliency of said members, and side plates secured to the opposite sides of the felly to prevent side movement of the resilient members.

In testimony whereof I have hereunto set my hand in the presence of two subscribing witnesses.

JAMES SEADLER.

Witnesses:
ERNEST MARTIN HOEN,
L. J. MILLER.

Copies of this patent may be obtained for five cents each, by addressing the "Commissioner of Patents, Washington, D. C."